(12) United States Patent  (10) Patent No.: US 8,199,357 B2
Miyagi  (45) Date of Patent: Jun. 12, 2012

(54) IMAGE PROCESSING APPARATUS AND METHOD DETECTING AND STORING AREAS WITHIN BAND IMAGES AND CUTTING OUT AN IMAGE FROM THE RESULTING STORED PARTIAL IMAGE

(75) Inventor: Arata Miyagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 575 days.

(21) Appl. No.: 12/489,178

(22) Filed: Jun. 22, 2009

(65) Prior Publication Data

US 2009/0316218 A1  Dec. 24, 2009

(30) Foreign Application Priority Data

Jun. 23, 2008  (JP) .................. 2008-163636

(51) Int. Cl.
*H04N 1/21* (2006.01)
*H04N 1/38* (2006.01)
*H04N 1/387* (2006.01)
*G06K 9/34* (2006.01)

(52) U.S. Cl. ...... 358/1.18; 358/1.16; 358/444; 358/453; 382/173; 382/282; 382/291

(58) Field of Classification Search ........ 358/1.16–1.18, 358/524, 538, 444, 450, 453; 382/282, 284, 382/286, 291, 294, 295, 173
See application file for complete search history.

(56) References Cited

U.S. PATENT DOCUMENTS

2010/0172589 A1* 7/2010 Ohki ............................ 382/298

FOREIGN PATENT DOCUMENTS

JP  2002-010059  1/2002
JP  2004-096489  3/2004

* cited by examiner

*Primary Examiner* — Scott A Rogers
(74) *Attorney, Agent, or Firm* — Canon USA Inc. IP Division

(57) ABSTRACT

An image obtained by reading an original using a reading device is input in units of band images, the input band image is analyzed, and an area corresponding to the original within the band image is detected. A partial image containing the detected area within the band image is stored in a memory, and an image corresponding to the original is cut out from the stored partial image.

12 Claims, 10 Drawing Sheets

[ZEROTH BAND]

[FIRST BAND]

[SECOND BAND]

[THIRD BAND]

[FOURTH BAND]

FIG. 5A

| ID | BAND NUMBER | CROP POSITION INFORMATION |
|---|---|---|
| 0 | 0 | (515, 10), (505, 15), (2021, 15), (2029, 12) |
| 1 | 1 | (505, 0), (464, 15), (1987, 15), (2021, 0) |
| 2 | 1 | (2358, 9), (2376, 15), (3648, 15), (3621, 7) |
| 3 | 2 | (464, 0), (443, 15), (1963, 15), (1987, 0) |
| 4 | 2 | (2376, 0), (2422, 15), (3692, 15), (3648, 0) |
| 5 | 3 | (443, 0), (418, 10), (1934, 13), (1963, 0) |
| 6 | 3 | (2422, 0), (2464, 15), (3044, 15), (3730, 13), (3692, 0) |
| 7 | 4 | (2464, 0), (2468, 2), (3044, 0) |

FIG. 5B

| BAND NUMBER | JPEG DATA GENERATION POSITION | JPEG DATA END POSITION | JPEG ENCODING WIDTH |
|---|---|---|---|
| 0 | 448 | 2079 | 1632 |
| 1 | 416 | 3679 | 3264 |
| 2 | 384 | 3743 | 3360 |
| 3 | 384 | 3775 | 3392 |
| 4 | 2432 | 3103 | 672 |

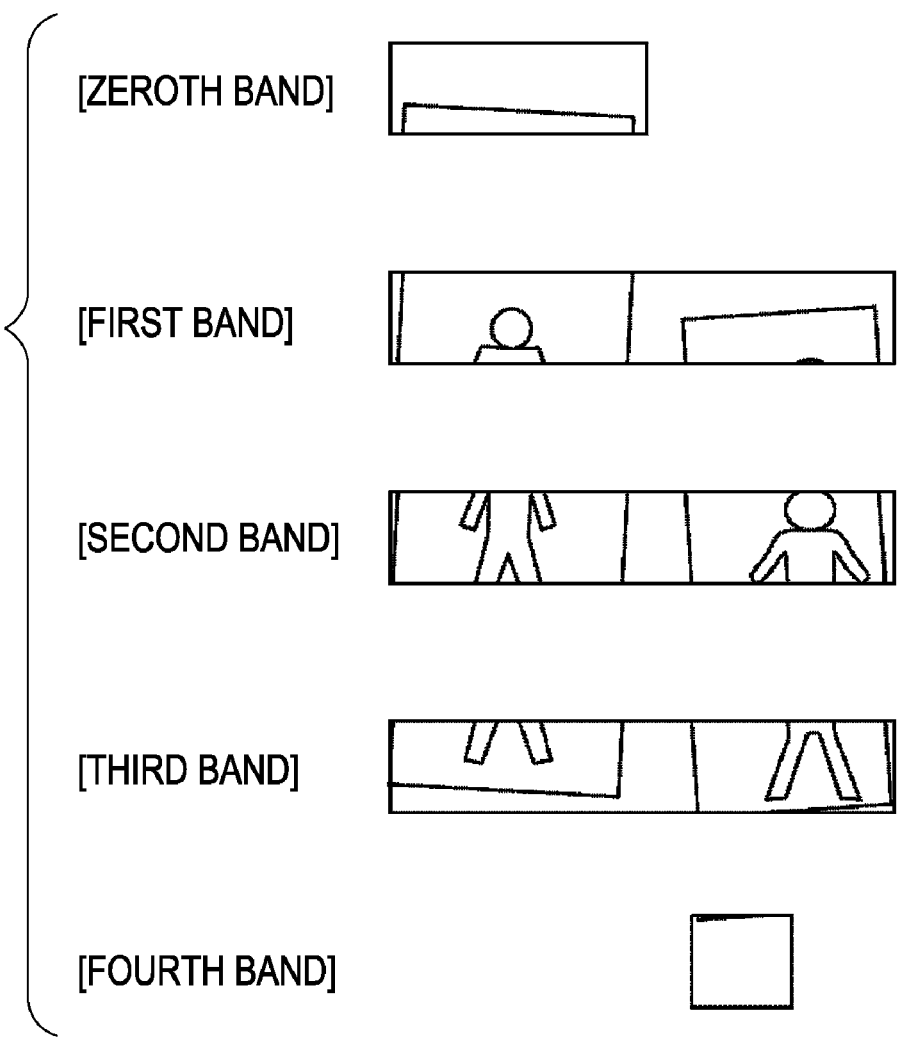

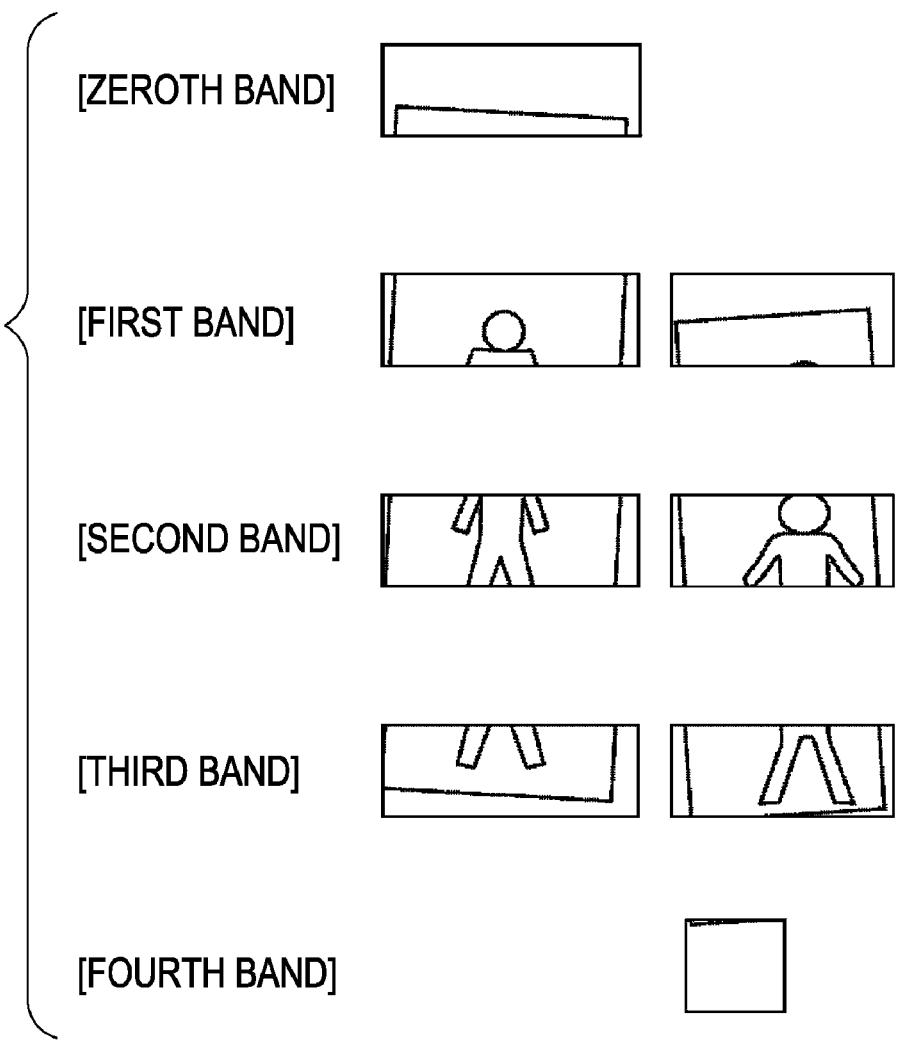

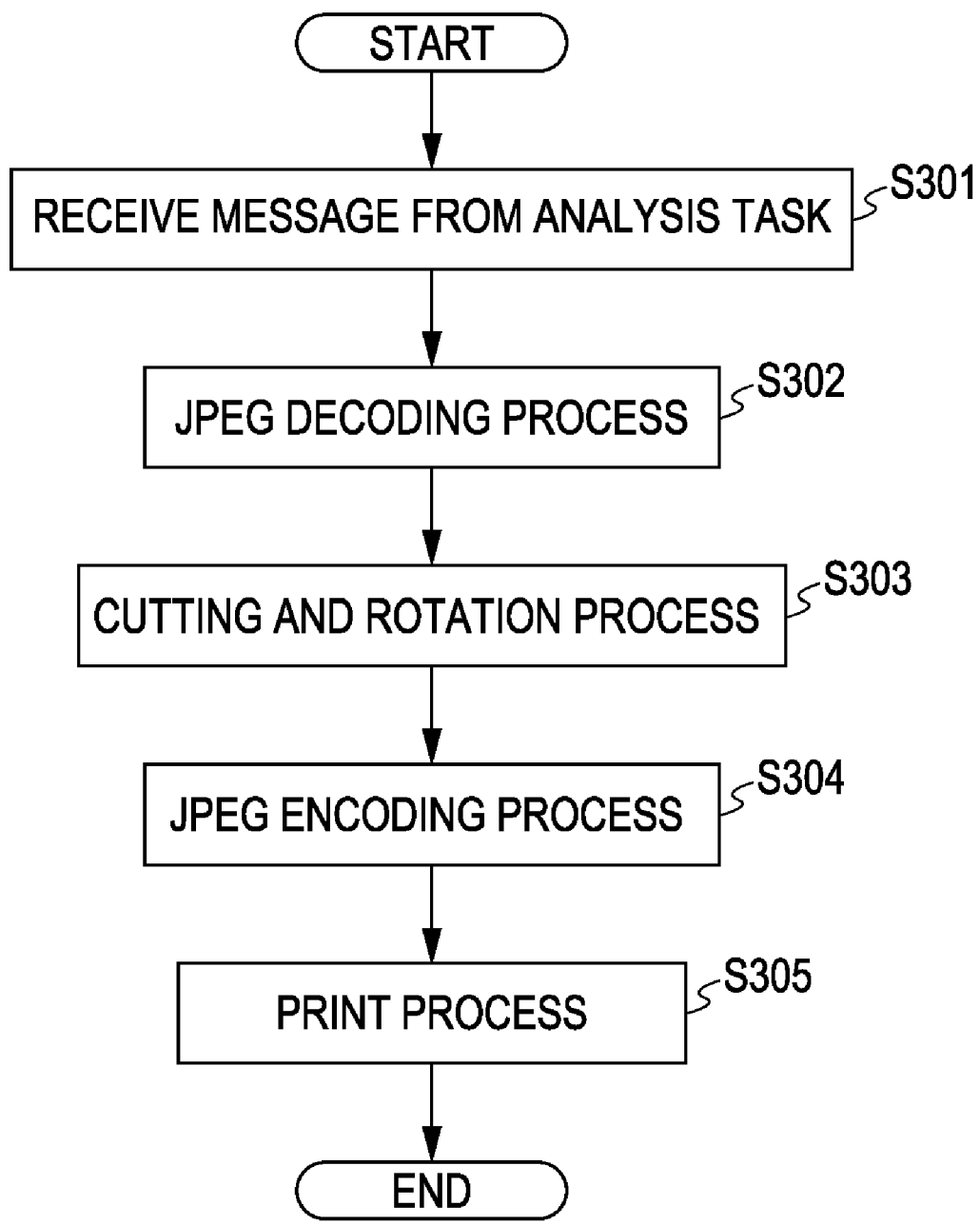

IMAGE PROCESSING APPARATUS AND METHOD DETECTING AND STORING AREAS WITHIN BAND IMAGES AND CUTTING OUT AN IMAGE FROM THE RESULTING STORED PARTIAL IMAGE

BACKGROUND OF THE INVENTION

1. Field of the Invention

The present invention relates to an image processing apparatus and a method of controlling the image processing apparatus, more specifically, an image processing apparatus for performing a cropping process on images read by a reading device.

2. Description of the Related Art

In recent years, multi-function printers (hereinafter referred to as "MFPs") in which a scanner and a printer are formed as one unit have become popular. Thus, image processing, such as copying of photographs, can be easily performed without using a PC or the like.

Examples of functions of such an MFP includes a cropping process for cropping a portion of a read image. For example, it is possible to obtain an image by cropping an area corresponding to an original placed on an original plate from the image obtained by reading the entire surface of the original plate.

Examples of functions using the cropping process include an inclination correction function of correcting the inclination of the image obtained by cut-out by the cropping process. Another example is a multi crop scanning function capable of cropping an area corresponding to each of the plurality of originals from the image obtained by reading the entire surface of the original plate when a plurality of small originals, such as photographs, are placed on the original plate. Still another example is a multi crop copying function of printing each of a plurality of images obtained by the multi crop scanning function on printing paper. Furthermore, as a technology in which these functions are combined, Japanese Patent Laid-Open No. 2002-10059 discloses a technology in which, when a plurality of originals are placed on an original plate, the inclinations of the respective images cropped by the multi crop scanning function are aligned.

In order to implement such a technology, it is considered that a memory (frame memory) capable of storing images obtained by reading the entire surface of the original plate can be provided, and a cropping process can then be performed on the images stored in the memory. However, there is a case in which the apparatus may not be provided with a memory having a sufficient capacity for reasons of cost or the like.

Also in such an MFP, it is common practice that reading operations are performed two times to implement a cropping process. More specifically, first, reading at a low resolution called pre-scanning is performed, and the obtained image is analyzed, thereby detecting an area to be cut out. Thereafter, reading at a high resolution is performed on the detected area, making it possible to obtain the cut-out image. Japanese Patent Laid-Open No. 2004-96489 discloses a technology for improving a processing speed when an area to be cut out is to be detected. More specifically, first, an image obtained by pre-scanning is made to have a lower resolution and is then analyzed, thereby detecting an area to be cut out. Furthermore, on the basis of the resolution of the image obtained by the pre-scanning, the position of the boundary of the detected area is adjusted.

However, the technology for performing a cropping process by performing the above-described reading two times has various problems. For example, there is a problem in that it takes time to obtain an image because two reading operations are performed. Furthermore, there is a possibility that the original on the original plate may be displaced due to influences, such as vibrations, in the time between first and second scannings. In that case, an area at the displaced position is cut out. Furthermore, another problem is that since the first and second scanning positions differ from each other depending on the accuracy of the scanning mechanism, the displaced position is cut out.

Some reading devices are configured to read an original by using an auto original feeder (hereinafter referred to as an "ADF") capable of automatically feeding a plurality of originals continuously in addition to reading an original placed on the original plate. Even in the case that a comparatively small original is to be read by using this ADF, a cropping process is necessary. However, in spite of the fact that it is necessary to read the same original two times continuously in a cropping process using two reading operations, many apparatuses cannot automatically read the same original continuously by using the ADF. For this reason, in a case where a plurality of originals are to be continuously read using an ADF, there is a problem in that a cropping process cannot be performed.

Therefore, in spite of the fact that, originally, a cropping process can preferably be performed by one reading operation, an insufficient capacity of a memory has been a problem.

SUMMARY OF THE INVENTION

An embodiment of the present invention provides an image processing apparatus capable of performing a cropping process by one reading operation even when the apparatus does not have a frame memory. Furthermore, the present invention provides an image processing apparatus including a memory configured to store images; an input unit configured to input, in units of band images, an image obtained by reading an original using the reading device; a detection unit configured to analyze the band image input by the input unit and detect an area corresponding to the original within the band image; a storage control unit configured to cause a partial image containing the area detected by the detection unit within the band image to be stored in the memory; and a cut-out unit configured to cut out an image corresponding to the original from the partial image stored in the memory.

Further features of the present invention will become apparent from the following description of exemplary embodiments with reference to the attached drawings.

BRIEF DESCRIPTION OF THE DRAWINGS

FIG. 5A shows detection results of an analysis task 802.
FIG. 5B shows a JPEG encoding target area of each band.
FIG. 6 shows an example of a JPEG encoding target area.
FIG. 7 shows an example of a JPEG encoding target area that is set for each original.

FIG. 10 is a flowchart illustrating the operation of a print task.

DESCRIPTION OF THE EMBODIMENTS

Figure 1:
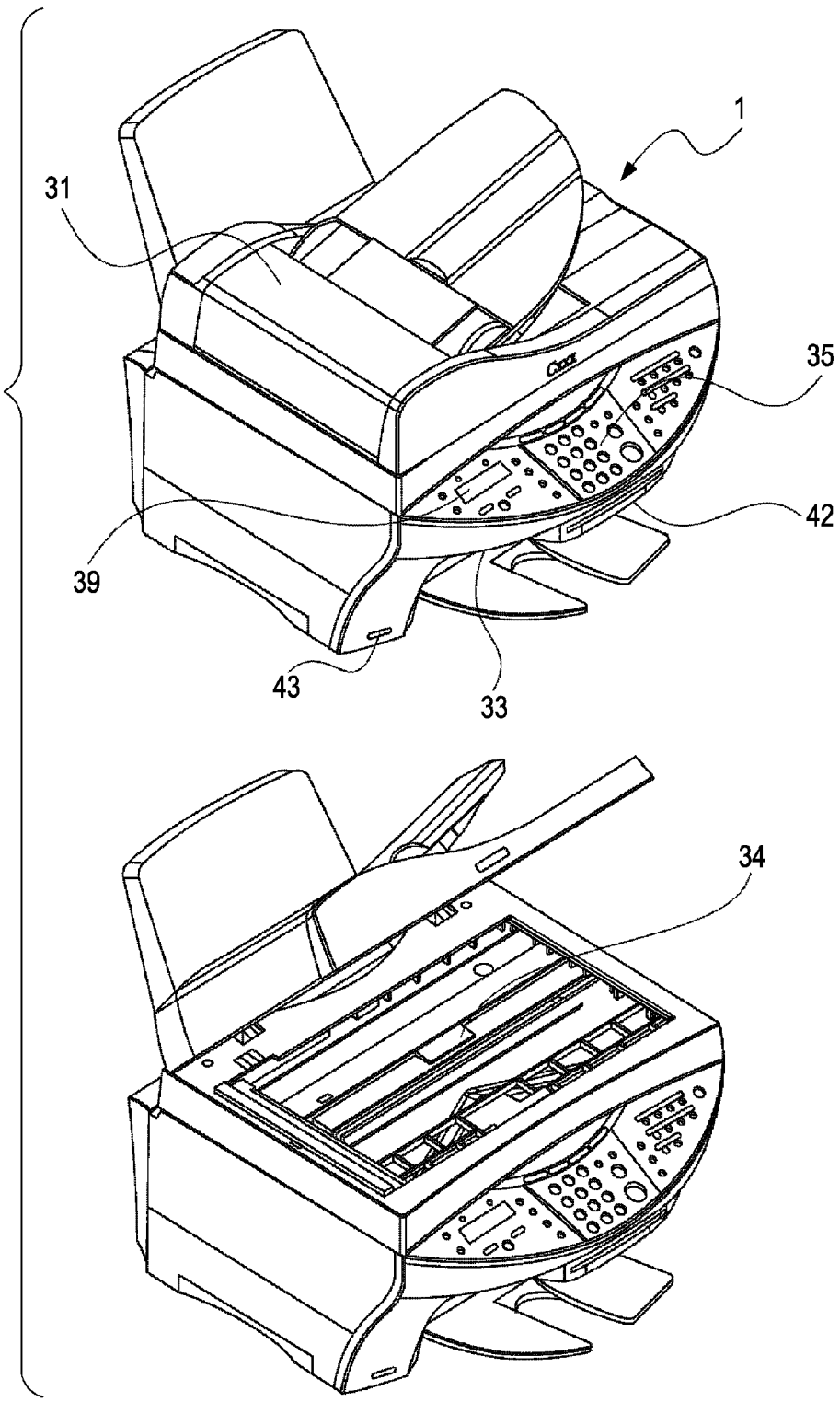
FIG. 1 is a profile perspective view of an MFP.

FIG. 1 is a profile perspective view of an MFP 1 according to an embodiment of the present invention. The MFP 1 has functions as an ordinary PC printer for receiving and printing data from a host computer (PC) and as a scanner. Furthermore, the MFP 1 has a copying function of printing an image read using a scanner by using a printer, as a function in which the MFP operates as a single unit. Furthermore, the MFP 1 has a function of directly reading image data stored on a storage medium, such as a memory card, and printing it, and a function of receiving and printing image data from a digital camera.

As shown in FIG. 1, the MFP 1 includes a reading device 34 such as a flatbed scanner, a printing device 33 employing an ink jet method, an electrophotographic method or the like, a display panel 39, such as an LCD, and an operation unit 35 having various kinds of key switches and the like. At the time of a copying operation, data processing is performed, inside the MFP, on image data obtained by reading an original placed on an original plate, and the printing device 33 prints the image data.

The reading device 34 includes sensors, such as CCDs, contact image sensors (CIS), or the like. When the reading device 34 reads the original image, the reading device 34 outputs analog luminance data of red (R), green (G), and blue (B). If an ADF 31 (to be described later) is provided, it is possible to continuously read originals, which is further convenient. Furthermore, the MFP 1 includes a drive unit (not shown), which is formed of a stepping motor for driving paper feed/eject rollers, gears for transferring the driving force of the motor, and the like, and which operates when the printing device 33 and the reading device 34 are used.

Examples of key switches possessed by the operation unit 35 include a photo direct print start key used to select image data stored on a storage medium and start recording, a key used to print an order sheet, and a key used to read an original. Other examples thereof include a copy print start key used for monochrome copying and for color copying, a mode key used to specify modes, such as a copying resolution and image quality, a stop key used to stop a copying operation, a ten-key pad used to input the number of copies, and a registration key. On the back of the MFP 1, a USB port (not shown) for performing communication with a PC is provided, so that communication with the PC is performed.

The MFP 1 includes, in addition to the above-described components, a card slot 42 to which various kinds of memory cards are inserted, and a camera port 43 to which a digital camera is connected. Furthermore, the MFP 1 includes an auto original feeder (hereinafter abbreviated as an "ADF") 31 for automatically setting an original on the original plate. Furthermore, the MFP 1 includes an image processing apparatus (not shown) as a controller. When the operation unit 35 is operated, instructions by a user are input to the controller, and various kinds of devices are operated under the control of the controller based on the input instructions. Furthermore, data communication with the PC, the memory card, and the digital camera is performed under the control of the controller.

Figure 2:
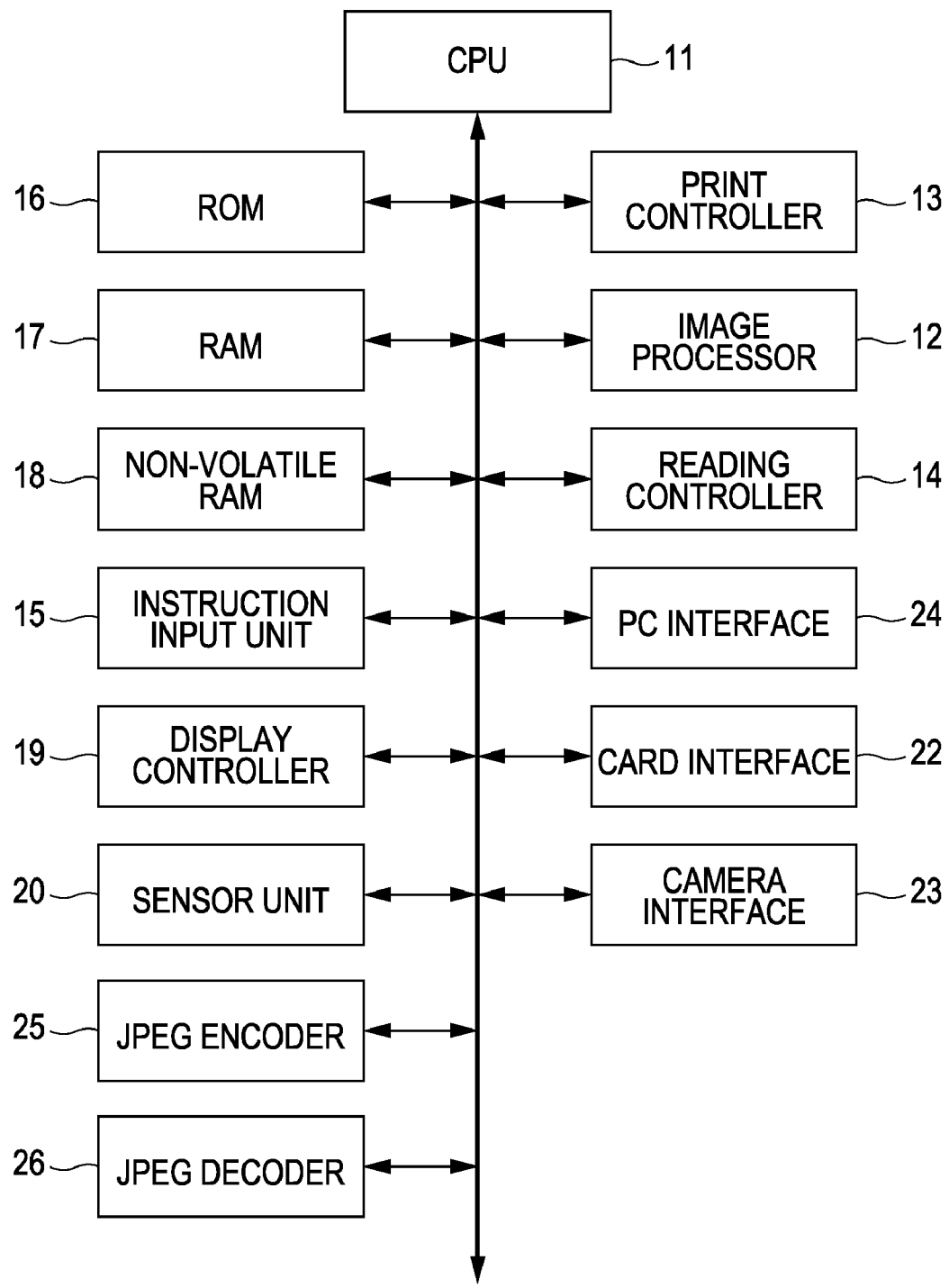
FIG. 2 is a block diagram showing the configuration of a controller.

FIG. 2 is a block diagram showing the configuration of the controller.

A signal in response to an operation performed via the operation unit 35 is input to an instruction input unit 15.

The CPU 11 executes a program stored in a ROM 16 on the basis of the input to the instruction input unit 15, thereby controlling the functions provided in the controller.

The ROM 16 has stored therein an operating system as well. This makes it possible to generate a plurality of tasks, which are execution units of the program. Since the CPU 11 can execute each program on a time-division basis, a plurality of programs can be executed as if they were simultaneously processed. Furthermore, the operating system can achieve synchronization among tasks by providing means, such as messages and events. This makes it possible to enable the CPU 11 to be efficiently used.

In the image processor 12, image processing (to be described later), such as image analysis, computation of conversion characteristics, conversion from a luminance signal (RGB) to a density signal (CMYK), scaling, gamma conversion, and error diffusion, is performed, and the data obtained thereby is stored in a RAM 17. When the data stored in the RAM 17 in this manner reaches a predetermined amount necessary for recording, the printing device 33 of FIG. 1 performs a recording operation. A non-volatile RAM 18 is, for example, an SRAM that is backed up using a battery, in which data specific to the image processing apparatus is stored.

The printing controller 13 controls the printing device 33, reads recorded data stored in the RAM 17, and outputs it to the printing device 33, whereby the data is printed under the control of the CPU 11. The reading controller 14 controls the reading device 34, drives sensors so as to read an image, and stores the image data input from the reading device 34 in the RAM 17.

A card interface 22 reads the image data recorded in a memory card inserted into a card slot 42 in accordance with instructions of the user, which are input to the instruction input unit 15, and stores the image data in the RAM 17. Furthermore, the card interface 22 writes image data in the memory card in accordance with the input to the instruction input unit 15. The color space of the image data that is read via the card interface 22 is, if necessary, converted by the image processor 12 from the color space (for example, YCbCr) of the digital camera to a standard RGB color space (for example, NTSC-RGB or sRGB). A camera interface 23 reads the image data recorded in the memory card provided in the digital camera in accordance with the input to the instruction input unit 15 via the camera port 43, and stores the image data in the RAM 17. A PC interface 24 stores, in the RAM 17, the image input from the PC via the USB port. Various processes necessary for applications, such as resolution conversion to the number of effective pixels, are performed as necessary on the image data read by these interfaces.

A display controller 19 is, for example, an LCD driver, which allows an image to be displayed on the display panel 39 under the control of the CPU 11. Furthermore, thumbnails of image data recorded in the memory card are displayed. A sensor unit 20 notifies the CPU 11 of inputs of various sensors, such as a recording paper width sensor, a recording paper presence/absence sensor, an original width sensor, an original presence/absence sensor, and a recording medium detection sensor. On the basis of these items of information, the CPU 11 detects the states of the original and the recording paper.

In accordance with the instructions from the CPU 11, a JPEG encoder 25 converts the data in a bitmap format, which is stored in the RAM 17, into a JPEG format that is a compression coding format, and then stores the data in the RAM 17. In accordance with the instructions from the CPU 11, a JPEG decoder 26 converts the JPEG data stored in the RAM 17 into data in a bitmap format, and then stores it in the RAM 17.

Figure 3:
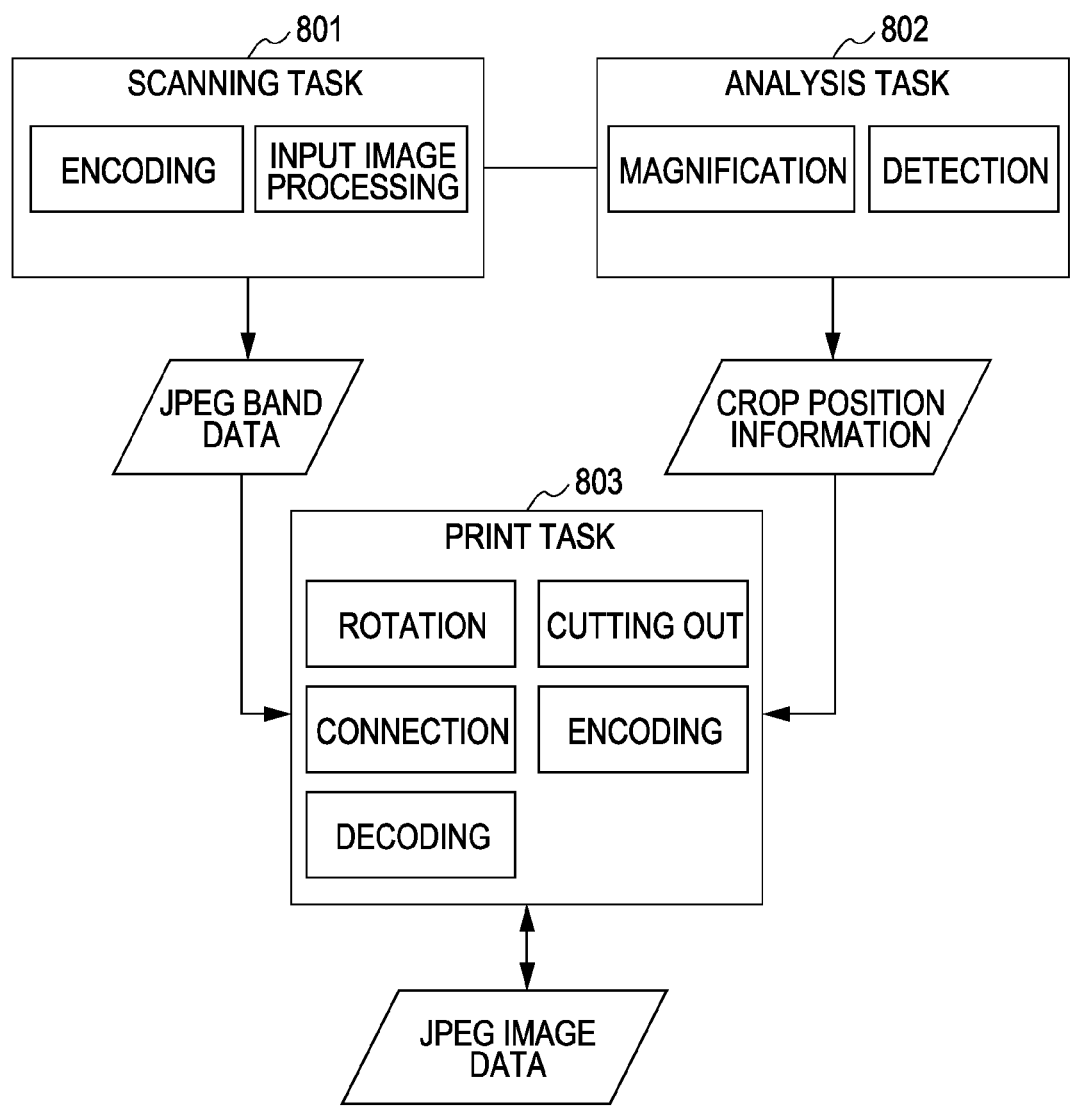
FIG. 3 is an organization diagram of a control program.

FIG. 3 is an organization diagram of a control program in the present embodiment.

Three tasks, that is, a scanning task 801, an analysis task 802, and a print task 803 of FIG. 3, operate while synchronization is achieved by using means provided by the operating system.

The scanning task 801 is a program with which input image processing and an encoding process are performed and a JPEG band image is created by referring to crop position information. The analysis task 802 is a program with which an image read by a scanning task is magnified and the image is analyzed, thereby generating crop position information. The print task 803 is a program with which JPEG image data is created by referring to a JPEG band image and the crop position information. Examples of the print task 803 include processings of rotation, cropping, connection, encoding, and decoding. The details of the operations of the scanning task 801, the analysis task 802, and the print task 803 will be described later.

The embodiment of the present invention is not limited to this. The embodiment may be divided into other various execution units or synchronization may be achieved by using other means. Part or the whole of control may be configured by hardware.

Next, a description will be given of multi crop in a case where the reading device is a flatbed scanner.

Figure 4A:
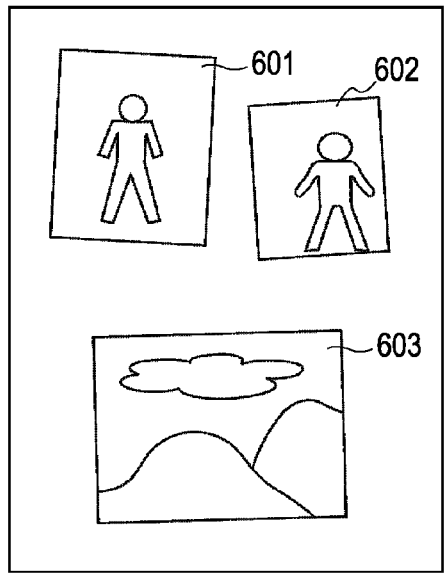
FIG. 4A shows an original plate on which originals are set.
Figure 4B:
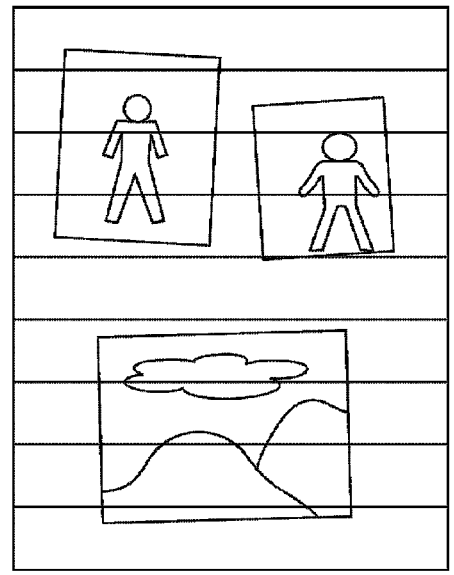
FIG. 4B shows images divided for each band.

FIGS. 4A and 4B show reading operations by means of a flatbed scanner according to the present embodiment. FIG. 4A shows an original plate on which originals are set. Here, originals 601, 602, and 603 are placed on the original plate with a space therebetween in such a manner that they do not overlap with one another. The sizes of the originals may differ from one another. The originals may be inclined with respect to the original plate. After the user places the originals on the original plate, when the user operates the operation unit 35 in accordance with the display of the display panel 39, a reading operation is started. Then, the whole read image is not input to the controller at a time, but is input for each band.

FIG. 4B shows images divided for each band. The details will be described later in step 101 of FIG. 8.

In FIG. 4B, one band includes 16 lines. In practice, the short side of each band is sufficiently shorter than the long side. However, for the sake of description, the short side of the band is represented to be greater than actually. Since image data is stored in the RAM 17 in units of band images, the number of lines included in one band is determined by the size of the RAM and by the amount of data that can be processed at a time by the image processor 12. In practice, approximately 8 to 32 lines are considered to be appropriate. In this case, when reading is performed at a resolution of 600 dpi, the width of one band becomes approximately 0.34 to 1.35 millimeters. Since this is sufficiently small when compared to the size of an ordinary original placed on the original plate, the data of the original is divided into a plurality of bands.

Figure 4C:
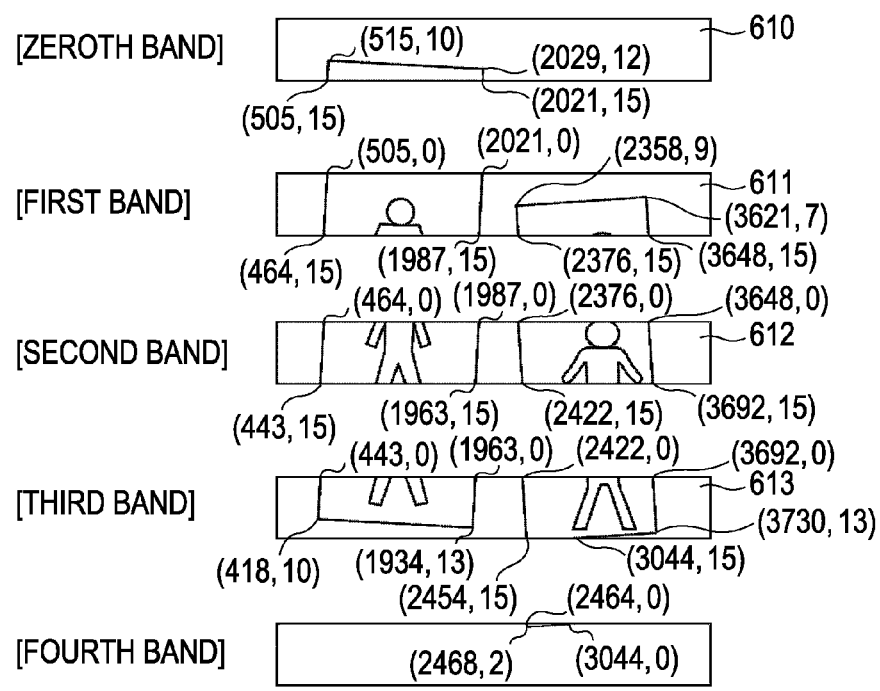
FIG. 4C shows image data in units of bands.

FIG. 4C shows image data in units of bands that are handled by the scanning task 801 (to be described later) of FIG. 3. Hereinafter, image data in units of bands will be referred to as band images.

Band images 610 to 613 are image data that is input to the reading controller 14 in step 101 of FIG. 8 (to be described later) and stored in the RAM 17. Since the RAM 17 of the present embodiment is not a frame memory, it is not possible for the RAM 17 to store all the bands forming an image obtained by reading the entire surface of the original plate. Therefore, in the case that a predetermined memory area of the RAM 17 is filled, the band image is overwritten and stored. The coordinates attached to each pixel of FIG. 4C are the coordinates of each point detected by the analysis task 802 and are the coordinates when the coordinates of the pixel in the upper left in the figure are set as (0, 0). These coordinates are crop position information.

FIGS. 5A and 5B show encoding target areas.

FIG. 5A shows a detection result of the analysis task 802 and shows crop position information indicating the position of the image included in each band in such a manner as to correspond to the coordinates shown in FIG. 4C. It is shown that, for example, one closed area surrounded by four points exists in band number 0 and two closed areas surrounded by four points exist in band number 1. It is also shown that one closed area surrounded by four points and one closed area surrounded by five points are contained in band number 3. It is further shown that one closed area surrounded by three points is contained in band number 4. In addition, IDs corresponding to the respective closed areas are attached.

FIG. 5B shows a JPEG encoding target area of each band. Each row of the table shows the X coordinate of the area to be encoded in the band and the width of the area. These areas are set in such a manner as to include the closed areas of the bands shown in FIG. 5A.

However, such encoding target areas are set under various limitations, with the result that the objective area may not match the area indicated by the crop position information. For example, in the present embodiment, since an image is encoded in a JPEG format, an encoding target area is selected so as to become a multiple of a minimum coded unit (hereinafter referred to as an "MCU"), which is an encoding unit of JPEG. A typical MCU of JPEG is 8 pixels in width and 8 pixels in height.

Depending on a JPEG encoder, there is a case in which the address of the RAM 17 in which image data input by the reading controller 14 is stored is limited. For example, in a case where there is a constraint such that image data to be input needs to be input to an area starting from an address that is a multiple of 32 bytes, the JPEG encoding area is selected so as to satisfy this constraint. In this case, in a case where input image data is in the form of 8 bits for each of RGB, an amount of information of 3 bytes per pixel is necessary. As a result, it is preferable that one line be formed of a multiple of 96 bytes, which is a least common multiple of 3 and 32. Therefore, if the X coordinate of the position at which JPEG encoding starts, and the width in the direction of the X coordinate for the object of encoding are formed of multiples of 32 pixels, subsequent processing becomes simple.

As will be described later, there are cases in which, when closed areas included in the crop position information of each band are connected, the closed areas do not become a rectangle due to read noise, an edge detection process, or for other reasons. In this case, image areas are adjusted so as to form a rectangle. By making JPEG encoding areas larger, the adjustment range can be allocated in advance.

In the present embodiment, an area in which the X coordinate of the position at which JPEG encoding starts and the width in the direction of the X coordinate in the encoding target area are multiples of 32 pixels, is determined, and the area is set to be larger by an amount corresponding to 31 or 32 pixels. This area can be determined from the X coordinate of the coordinates at each point in FIG. 5A, which is detected for each band, on the basis of the following calculation.

(Start $X$ coordinate of JPEG encoding area)=Max ([minimum $X$ coordinate among points detected in band/32]×32−32,0)    Expression (1)

(End X coordinate of JPEG encoding area)=Min
([((maximum X coordinate among points
detected in band+31)/32)]×32+31,number of
pixels of one line−1)   Expression (2)

where [ ] represents a Gauss symbol, which indicates a maximum integer that does not exceed the enclosed value. The area from the X coordinate determined by Expression (1) up to the X coordinate determined by Expression (2) is an area for the object of the JPEG encoder. In the present embodiment, JPEG is exemplified as an encoding format, but an encoding format other than JPEG may be adopted.

FIG. 6 shows an example of a JPEG encoding target area. When a cropping process is performed on the images shown in FIG. 4, an image including the original placed on the original plate among the band images can be made to be a target of encoding in the manner described above. Here, this image to be encoded among the band images will be referred to as a partial image.

FIG. 7 shows an example of a JPEG encoding target area set for each original. If setting is performed in such a manner that JPEG encoding is performed for each of the areas corresponding to the originals in one band as described above, it is possible to further reduce the memory capacity necessary to store the JPEG encoded result.

Figure 8:
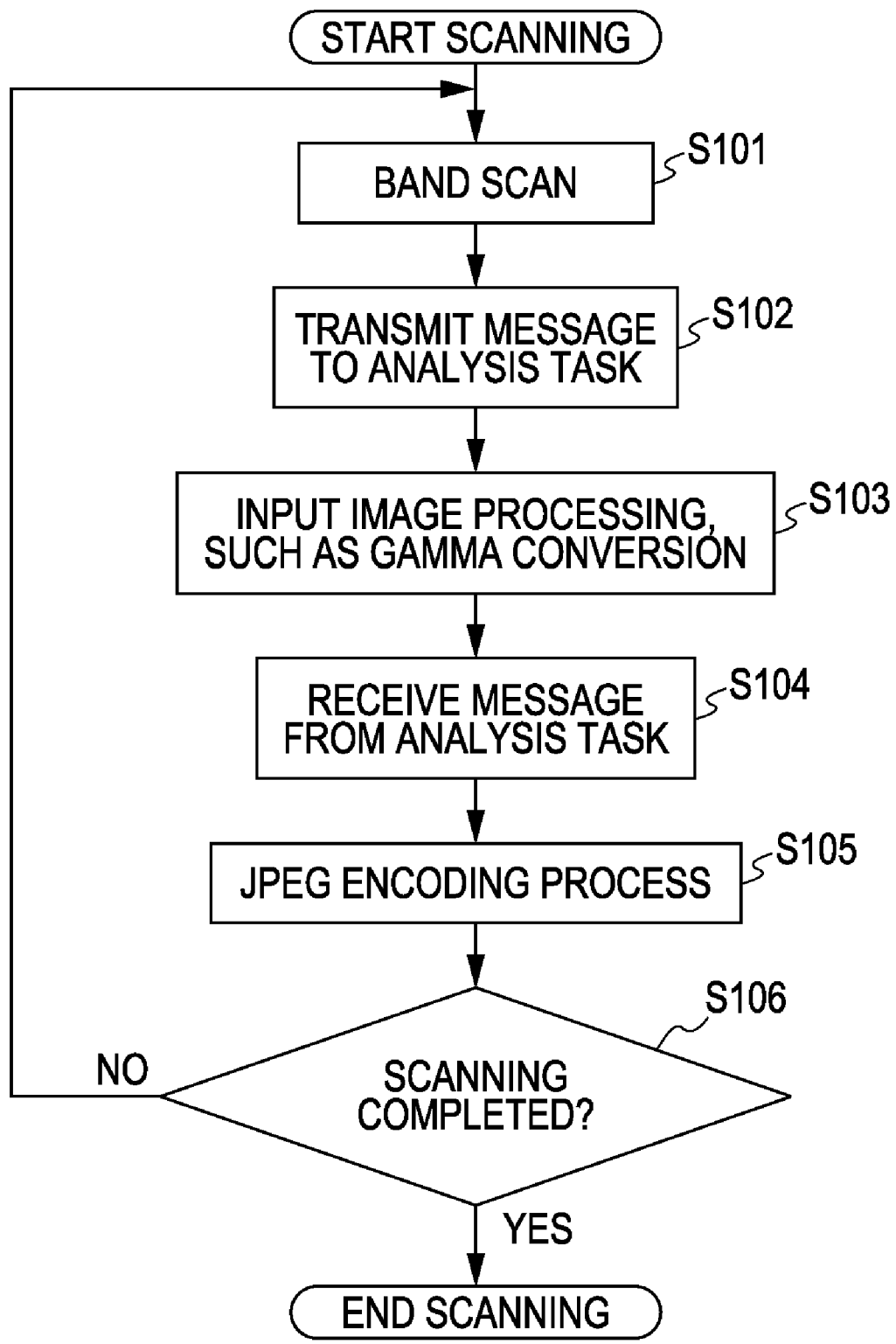
FIG. 8 is a flowchart illustrating the operation of a scanning task.

FIG. 8 is a flowchart illustrating the operation of a scanning task.

A scanning task performs image processing for image data read by the scanner unit within image processing necessary for an MFP.

In step 101, image data for 16 lines is input to the reading controller 14 to scan bands to obtain a band image that is stored in the RAM 17 in a buffer memory area for temporary storage. The process then proceeds to step 102.

In step 102, a message indicating that a band image has been obtained in step 101 is transmitted to an analysis task. The process then proceeds to step 103.

In step 103, image processing is performed on the input image data obtained in step 101. Examples of image processing for input image data include gamma conversion, application of a look-up table from the device color space of the scanner to the standard color space, and a base removal process. These image processings are performed by the image processor 12.

Figure 9:
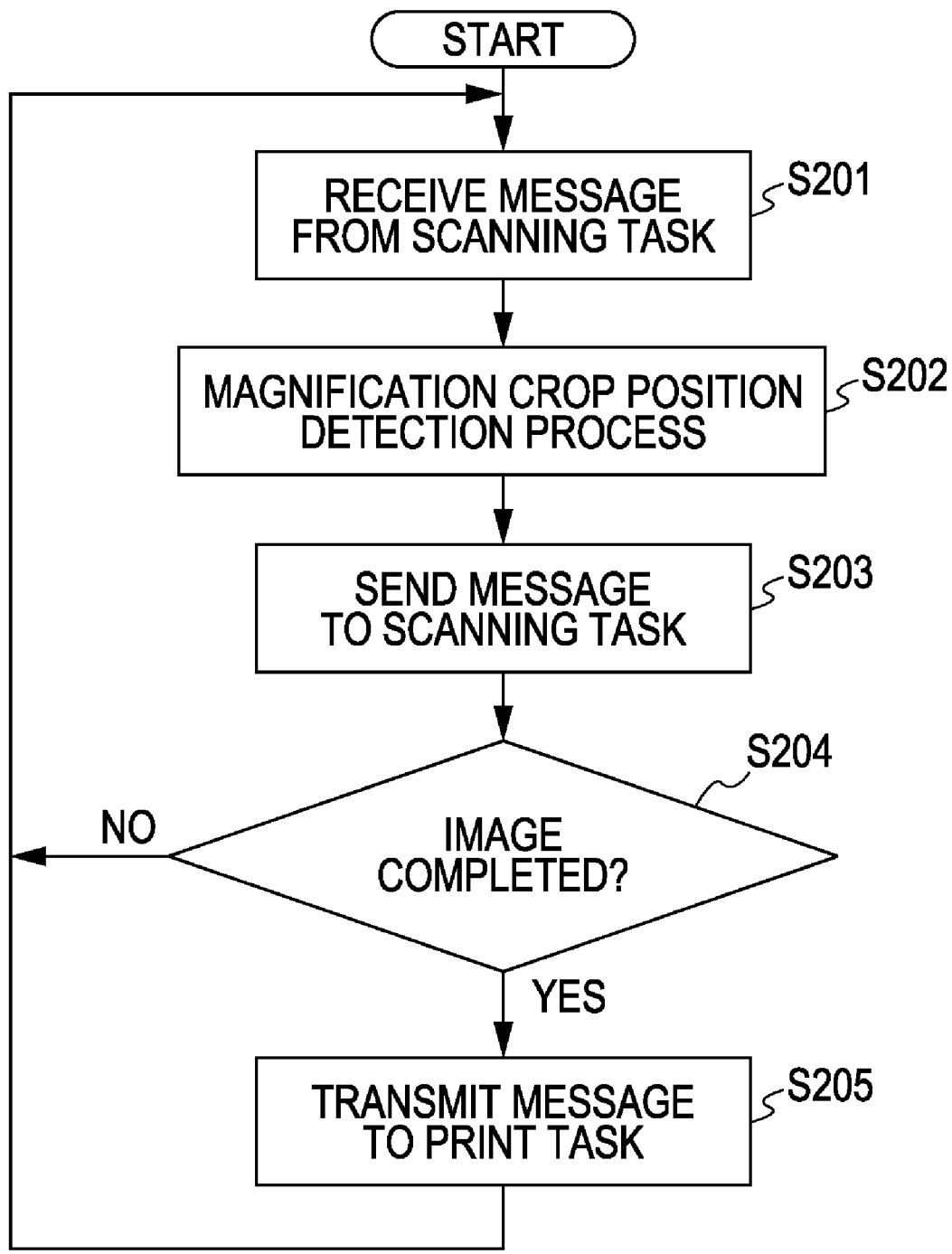
FIG. 9 is a flowchart illustrating the operation of an analysis task.

In step 102, instead of transmitting a band image to the analysis task in step 101, a band image on which image processing has been performed may be transmitted in step 103. However, with regard to the image after gamma conversion and a base removal process have been performed, a crop position detection process in the analysis task (to be described later) in step 202 of FIG. 9 is difficult. For this reason, it is preferable that the image to be transmitted to the analysis task be a band image obtained in step 101 rather than the band image on which image processing has been performed in step 103.

Next, in step 104, a message indicating a JPEG encoding target area is received from the analysis task. Upon receiving the message, the process proceeds to step 105.

In step 105, in accordance with the message received in step 104, the JPEG encoder target area of the band image on which image processing has been performed in step 103 is encoded by the JPEG encoder 25, thereby creating a JPEG band image. Furthermore, storage control for storing the generated JPEG band image in the RAM 17 is performed.

In the description of FIG. 8, both the image in step 101 and the image in step 105 are stored in the RAM 17, but may be stored in different memories. For example, in step 101, the image needs only to be stored in a buffer memory area, which is an area for temporarily storing an image, and the storage destination does not matter.

With reference to FIG. 5B, since the encoding start position corresponding to band 0 is 448 and the end position is 2079, an area having a width of 1632 pixels from the X coordinate of 448 to 2079 is encoded by the JPEG encoder 25. A portion that is not encoded is deleted from the RAM 17. In the case that the JPEG encoding target area does not exist in the band image, that is, the band image does not include an image corresponding to the original, encoding is not performed. When a JPEG band image is created as described above, the process proceeds to step 106.

In step 106, it is determined whether or not the entire surface of the original plate has been scanned.

If the entire surface of the original plate has been completely scanned (YES in step S106), the scanning is completed. Examples of the scanning ending process include processing necessary for the mechanism, such as returning the scanner head to the home position. If it is determined in step 106 that the entire surface of the original plate has not been completely scanned (NO in step S106), the process returns to step 101, where the next band is scanned.

As a result of steps 101 to 106 above being repeatedly performed by the scanning task 801, reading is sequentially performed for each band, and the JPEG band images are sequentially stored in the RAM 17. Therefore, this process makes it possible to create a JPEG band image including the original placed on the original plate.

By not performing encoding on a band that does not include an image corresponding to the original and on a portion within the band where an original is not contained as described above, there is an advantage that the amount necessary for using the RAM is decreased when compared to the case where all the bands in which the entire surface of the original plate has been read are encoded. Furthermore, as a result of performing compression in accordance with JPEG, there is an advantage that the amount necessary for using the RAM is decreased when compared to the case in which the data on RGB is directly stored in the RAM.

In this flowchart, after gamma conversion is performed in step 103, JPEG encoding is performed in step 105. The reason for this is that if gamma conversion is performed after JPEG encoding is performed, the gradation characteristics will be lost. The reason for this is that the image input by the reading controller 14 has a gradation larger than 8 bits (256 gradations) per color of RGB of one pixel, but a gradation larger than 256 gradations of each color of YCBCr will be lost in terms of the specification of the format in JPEG. Therefore, if the image is made to be of 256 gradations of YCBCr by performing JPEG encoding and gamma conversion is performed after the image is made to be of 256 gradations, the gradation characteristics may be lost in such a degree as to be recognized at a glance.

Therefore, by using the data to be encoded as data on which image processing has been performed in step 103, it is possible to suppress deterioration of the gradation characteristics due to conversion into JPEG.

FIG. 9 is a flowchart illustrating the operation of an analysis task.

In step 201, a message transmitted by the scanning task in step 102 is received. As described above, the analysis task receives the message transmitted by the scanning task in step 102 and then proceeds to the next step. Thus, it is possible to cause the process of the analysis task to proceed in synchronization with the degree of the progress of the scanning task process.

That is, the analysis task continues to wait until a message can be received, and upon receiving the message, the process proceeds to step 202.

In step 202, crop position information is generated from the image data that is stored in the RAM 17 in step 101 by the scanning task. First, the analysis task converts the resolution of the image data that is stored in the RAM 17 in step 101 by the scanning task, creates an image of a second resolution, and stores it in the RAM 17. Since the resolution of the image to be created by the scanning task is approximately 600 dpi, by decreasing this resolution to be approximately 150 dpi, the number of pixels to be processed by the CPU 11 can be decreased. As a result of decreasing the second resolution, although there is a problem that the accuracy of the analysis result is decreased, it is possible to resultingly shorten the time required for the analysis task to perform image analysis.

Furthermore, the second resolution makes it possible to adjust the time required for the image analysis by the analysis task. It is possible to adjust to a processing speed appropriate to the reading device by specifying the resolution to a smaller resolution (for example, 100 dpi) in the mode in which the operation of the reading device is fast and by specifying the resolution to a larger resolution (for example, 300 dpi) in the mode in which the operation of the reading device is slow.

By performing binarization after an edge detection process is performed on the image whose resolution is converted and reduced as described above, and by performing a labeling process, an area corresponding to the original within the band image is detected. For the edge detection process, various known filters, such as a Sobel filter, can be used. Furthermore, by performing intensity determination in addition to a labeling process, a discrimination between an original area and an area other than the original area (that is, a pressure plate) is performed to obtain crop position information by using the fact that the color of the pressure plate of the original plate is white.

In step 202, by using Expressions (1) and (2) described above, a JPEG encoding target area is determined on the basis of the crop position information. Upon generating the crop position information in this manner, the process proceeds to step 203.

In step 203, a message containing information indicating the JPEG encoding target area is transmitted to the scanning task. Upon transmitting the message, the process proceeds to step 204.

In step 204, it is determined whether or not the image has been completed. The determination as to whether or not the image has been completed can be performed in such a manner that if one of the coordinates indicated by the crop position information does not reach the lower end of the band, it indicates the end of the connected closed areas. For example, in the image area of the third band shown in FIG. 4C, since the maximum Y coordinate value is 13, one image can be assumed to be completed. Even in the case that the maximum Y coordinate value is 15, the coordinate can be determined to be the end of one connected closed area as well in the case that a connected image area does not exist in the determination of the next band. In the case that the end point (the corner of the original) of the original image is contained in the band image and the end point thereof is the lower end of the original in the manner described above, it can be determined that the original has been completed.

If it is determined that the image has been completed (YES in step S204), the process proceeds to step 205. If it is determined that the image has not been completed (NO in step S204), the process returns to step 201, where waiting for the scanning task to read the next band is done and a message is transmitted.

In step 205, a message containing crop position information is transmitted to the print task so that printing is instructed to be performed on the basis of the JPEG band image and the crop position information. Upon transmitting the message, the process returns to step 201.

FIG. 10 is a flowchart illustrating the operation of a print task.

In step 301, the message transmitted by the analysis task in step 205 is received. The fact that this message has been received means that the JPEG band image of the image corresponding to the original has been stored in the RAM 17 and the image corresponding to the original can be cut out.

Also, in step 301, a portion of the image corresponding to the original included in the adjacent JPEG band image is connected as one area. For the connection, an area to be connected is detected on the basis of the crop position information received from the analysis task. For example, it can be seen in FIG. 5A that the line segment (505, 15) and (2021, 15) of band number 0 in the row of ID=0 and the line segment (2021, 0) and (505, 0) of band number 1 in the row of ID=1 are in contact with each other over 1517 pixels. Therefore, the areas of ID=0 and ID=1 can be determined as one collective area. In a similar manner, the areas of ID=0, ID=1, ID=2, and ID=3 can be determined as one connected area. In a similar manner, the areas of ID=2, ID=4, ID=6, and ID=7 can be determined as one connected area.

Furthermore, the coordinates may be adjusted so that the connected areas become a rectangle. The connected areas are, as they are, a connected polygon, and is not always to be a rectangle. As a consequence, they are unsuitable for subsequent processing, such as printing and display. A method for approximating one straight line by using a least square method for coordinates of image area information can be considered. As described above, when the message is received and a plurality of areas are connected, the process proceeds to step 302.

In step 302, the JPEG band image of each band including the areas connected in step 301 is decoded, the image is converted into bit map data having RGB values, and the bit map data is stored in the RAM 17. At this time, if the number of pixels necessary to be encoded in step 304 (to be described later) is calculated and as many MCUs as necessary are decoded, a smaller amount of memory used for the RAM 17 is required to be decoded.

In step 303, a portion corresponding to the rectangular area connected in step 301 is cut out from the RGB data decoded in step 302 and is rotated. For an interpolation method at the time of rotation, a nearest neighbor method, a linear interpolation method, or the like can be used.

In step 304, the image rotated in step 303 is encoded to a JPEG format, and JPEG image data corresponding to the connected rectangular area is generated. Next, the process proceeds to step 305 for print processing, where JPEG image data generated in step 304 is printed. When the print is completed, the processing is completed.

The JPEG image data to be printed is JPEG image data equivalent to one sheet of the original. Therefore, the print processing is the same as that performed generally with a so-called card direct or camera direct function.

As has been described above, as a result of the processing shown in FIG. 10, it is possible to cut out JPEG image data corresponding to the original from the plurality of JPEG band images stored in the RAM 17 and possible to print the data. When the analysis task determines that the image corresponding to the original is completed (YES in step 204 of FIG. 9) and a message is transmitted to the print task from the analysis task, the processing shown in FIG. 10 is performed again.

According to the above embodiment, an image obtained by reading the entire surface of the original plate is stored for each band image, and an original area within the band image is detected. When a plurality of bands are stored, in the case that the plurality of stored bands contain an original image, the original image is cut out.

As a result, since it is not necessary to store a band image not containing the original area or an area that is not the original area in the band image, the cropping process based on one reading operation can be performed with a memory capacity smaller than in the related art. Therefore, also, it is not necessary for an apparatus not having a frame memory to perform scannings two or more times, thereby presenting an advantage that the time until the operation is completed is shortened. Another advantage is that the problem of cutting out a displaced position, which occurs due to performing scannings two or more times, does not occur. Furthermore, since a scanning operation and an analysis process are performed in units of bands, it is possible to determine whether or not the read image has been completed even if the scanning has not been completed and possible to start printing in sequence. For this reason, there is an advantage that the time until the operation is completed is shortened.

In addition, according to the above embodiment, since intermediate data is stored as JPEG bands, there is the advantage of capable of obtaining a memory reduction effect even when an original covering the entire surface of the original plate is input.

In the above embodiment, a case in which JPEG image data obtained by the cropping process according to the present invention is used for printing applications has been described. However, the applications of the present invention are not limited to this. For example, the present invention can be used to store JPEG image data in a memory card via the card interface 22 or to transfer JPEG image data to a PC via the PC interface 24.

In the above embodiment, an example of multi cropping in a case where a plurality of originals are placed on the original plate has been described. However, the present invention is not limited to this, and a cropping process in a case where the number of originals is one may also be used. Furthermore, the present invention encompasses not only a case in which an original is placed on an original plate and read, but also a case in which a cropping process is performed on an image that is read and obtained using an ADF.

Normally, since the ADF reads stacked originals one by one while the originals are fed one by one, only one original is being read at any one time. The ADF is configured in such a manner that since the original that has been read up to the end of the sheet once has moved beyond the rollers, a second scanning starting from the beginning of the original once more cannot be performed. Therefore, in the case that originals are to be continuously read using an ADF, since a cropping process necessitating two reading operations cannot be performed, the present invention is particularly effective for an apparatus having an ADF but not having a frame memory.

In addition, in accordance with the present invention, it is possible to correct the inclination of an image read by an ADF. That is, the ADF is provided with an original feed guide so that an original is not inclined. There are cases in which an original is not fed in a straight manner owing to a user not correctly setting the original feed guide and so the original is read inclined. In such a case, it is possible to cut out an area corresponding to the original from the image read using the cropping process of the present invention and correct the inclination.

In addition, an object of the present invention is achieved by supplying a recording medium storing program code realizing functions of the above-described embodiments to a system or an apparatus. In this case, a computer (or a CPU or an MPU) of the system or the apparatus reads out and executes the program code stored on the recording medium, whereby the above-described functions are realized. In this case, the recording medium storing the program code and the program code itself constitute the present invention.

Examples of recording media for supplying program code include a hard disk, a CD-ROM, a CD-R, a non-volatile memory card, a ROM, and a DVD.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-163636 filed Jun. 23, 2008, which is hereby incorporated by reference herein in its entirety.

What is claimed is:

1. An image processing apparatus for cutting out an image corresponding to an original from an image obtained by reading the original using a reading device, the image processing apparatus comprising:
a memory configured to store images;
an input unit configured to input, in units of band images, an image obtained by reading an original using the reading device;
a detection unit configured to analyze the band image input by the input unit and detect an area corresponding to the original within the band image;
a storage control unit configured to cause a partial image containing the area detected by the detection unit within the band image to be stored in the memory; and
a cut-out unit configured to cut out an image corresponding to the original from the partial image stored in the memory.

2. The image processing apparatus according to claim 1, wherein the cut-out unit cuts out an image corresponding to the original from a plurality of partial images stored in the memory.

3. The image processing apparatus according to claim 2, wherein the cut-out unit cuts out an image when it is determined that an image has been input in a case where an end point of the image corresponding to the original has been detected by the detection unit.

4. The image processing apparatus according to claim 1, wherein the storage control unit causes image data to be compressively coded and stored.

5. The image processing apparatus according to claim 3, wherein the storage control unit causes image data to be stored in a Joint Photographic Experts Group format.

6. The image processing apparatus according to claim 1, wherein, when an area corresponding to the original within the band image is not detected by the detection unit, the storage control unit does not perform storage.

7. The image processing apparatus according to claim 1, wherein when a band image is input, the input unit overwrites and stores the band image in a buffer memory area.

8. The image processing apparatus according to claim 1, wherein the image cut out by the cut-out unit is output to a printing device for printing.

9. The image processing apparatus according to claim 1, wherein the image cut out by the cut-out unit is stored in a memory card.

10. The image processing apparatus according to claim 1, wherein the reading device reads an original placed on an original plate, and the input unit inputs an image obtained by reading the original placed on the original plate.

11. An image processing method for cutting out an image corresponding to an original from an image obtained by reading the original using a reading device, the image processing method comprising steps of:

inputting, in units of band images, an image obtained by reading an original using the reading device;

analyzing a band image input in the input step and detecting an area corresponding to the original within the band image;

causing a partial image containing the area detected in the detection step within the band image to be stored in a memory; and cutting out an image corresponding to the original from the partial image stored in the memory.

12. A non-transitory computer-readable storage medium storing a computer-readable process, the computer-readable process causing a computer to implement a method for cutting out an image corresponding to an original from an image obtained by reading the original using a reading device, the method comprising:

inputting, in units of band images, an image obtained by reading an original using the reading device;

analyzing a band image input in the input step and detecting an area corresponding to the original within the band image;

causing a partial image containing the area detected in the detection step within the band image to be stored in a memory; and cutting out an image corresponding to the original from the partial image stored in the memory.

* * * * *